（12) United States Patent
Cowen et al.

(10) Patent No.: US 9,520,003 B2
(45) Date of Patent: Dec. 13, 2016

(54) TRANSPORT SYSTEM USER INSPECTION

(71) Applicant: MasterCard International Incorporated, Purchase, NY (US)

(72) Inventors: Michael J. Cowen, London (GB); James C. Noe, Kent (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/661,851

(22) Filed: Mar. 18, 2015

(65) Prior Publication Data

US 2015/0269786 A1    Sep. 24, 2015

(30) Foreign Application Priority Data

Mar. 19, 2014    (GB) .................................. 1404908.4

(51) Int. Cl.
| | |
|---|---|
| G07B 15/02 | (2011.01) |
| G07B 15/00 | (2011.01) |
| G06F 17/30 | (2006.01) |
| G06Q 20/34 | (2012.01) |
| G06Q 20/40 | (2012.01) |
| G06Q 20/08 | (2012.01) |

(52) U.S. Cl.
CPC ......... *G07B 15/00* (2013.01); *G06F 17/30336* (2013.01); *G06F 17/30867* (2013.01); *G06Q 20/08* (2013.01); *G06Q 20/34* (2013.01); *G06Q 20/341* (2013.01); *G06Q 20/4014* (2013.01); *G07B 15/02* (2013.01)

(58) Field of Classification Search
CPC ......... G07B 15/00; G07B 15/02; G06Q 10/00; G06Q 10/02; G06Q 20/00; G06Q 20/28; G06Q 20/342; G06Q 20/349; G06Q 30/0235; G06Q 30/0258; G07C 9/00015

USPC .................. 235/384, 492, 380, 375
See application file for complete search history.

(56) References Cited

U.S. PATENT DOCUMENTS

2002/0010603 A1* 1/2002 Doi ................. G06Q 10/02
                                              705/5
2002/0140553 A1* 10/2002 Bachtiger ........... G07B 15/02
                                              340/539.1

(Continued)

FOREIGN PATENT DOCUMENTS

| WO | WO2006/016323 | 2/2006 |
| WO | WO2007/095372 | 8/2007 |

OTHER PUBLICATIONS

Utah Transit Authority, Electronic Fare FAQs, downloaded from https://web.archive.org/web/20131125165458/http://www.rideuta.com/mc/?page=RidingUTA-PayingYourFare-EFC-FAQs on Sep. 9, 2014.

(Continued)

*Primary Examiner* — Thien M Le
(74) *Attorney, Agent, or Firm* — Otterstedt, Ellenbogen & Kammer, LLP

(57) ABSTRACT

A method of inspecting a user device of a user of a transport system includes obtaining, by a portable inspection device, identification data of a user device of a user of a transport system; generating an inspection result of the user device, by an inspection system, in dependence on the read identification data and an item in a record within a database, wherein the record comprises a plurality of items each relating to entry data of a respective user device of a respective of users of the transport system; and conveying, by the portable inspection device, the result of the inspection.

20 Claims, 3 Drawing Sheets

(56) References Cited

U.S. PATENT DOCUMENTS

| | | | |
|---|---|---|---|
| 2006/0277078 A1* | 12/2006 | Ohmori | G06Q 10/02 |
| | | | 705/5 |
| 2007/0299868 A1* | 12/2007 | Huomo | G06Q 20/045 |
| 2008/0156873 A1* | 7/2008 | Wilhelm | G07B 15/00 |
| | | | 235/384 |
| 2008/0179394 A1 | 7/2008 | Dixon et al. | |
| 2008/0201212 A1 | 8/2008 | Hammad | |
| 2011/0208645 A1 | 8/2011 | Knauft | |
| 2012/0278137 A1 | 11/2012 | Dixon et al. | |
| 2013/0173357 A1* | 7/2013 | Lishak | G06Q 10/00 |
| | | | 705/13 |

OTHER PUBLICATIONS

Search Report for U.K. Application No. GB1404908.4, Sep. 12, 2014.
Authorized Officer Paul Verhoof of the EPO acting as ISA, International Search Report pp. 1-4 and Written Opinion of the ISA pp. 1-6, PCT Patent Application PCT/GB2015/050605, Jun. 9, 2015.

* cited by examiner

| Tokenised PAN | Entry time | Entry location |
|---|---|---|
| 9FBC193A9BB | 15/10/13 at 07:55:10 | Station 1 |
| A40F0B8CC76 | 15/10/13 at 07:55:11 | Station 2 |
| 4783B2C27AE | 15/10/13 at 07:55:12 | Station 3 |
| EEBC8AC8A64 | 15/10/13 at 07:55:13 | Station 4 |

*FIG. 2*

| Station | List status | Last update of list |
|---|---|---|
| Station 1 | Complete | 15/10/13 at 07:55:15 |
| Station 2 | Complete | 15/10/13 at 07:56:40 |
| Station 3 | Incomplete | 15/10/13 at 08:10:33 |
| Station 4 | Complete | 15/10/13 at 08:10:34 |

*FIG. 3*

TRANSPORT SYSTEM USER INSPECTION

CROSS REFERENCE TO RELATED APPLICATIONS

This application claims foreign priority to United Kingdom Patent Application 1404908.4, filed 19 Mar. 2014, the complete disclosure of which is expressly incorporated herein by reference in its entirety for all purposes.

FIELD OF THE INVENTION

The present invention relates generally, but not exclusively, to the verification of required behaviour by users of a transport system. Embodiments of the invention are particularly applicable when a user's chosen means of fare payment is by tapping a standard-issue contactless bank card on entry to or within the transport system. Embodiments of the invention reduce the number of situations in which a ticket inspector, or controller, is unable to ascertain at the point of inspection whether a user being inspected has tapped-in as required at the start of their journey.

BACKGROUND TO THE INVENTION

The transport systems of many large cities, including London, Paris and Singapore, require users to have a proprietary transit card in order to pay for their journey. The issuance of the proprietary card for each transport system may be in the tens of millions.

Typically, a proprietary transit card allows a user to store single ride tickets, season tickets, a prepaid balance or a combination of any of these on it. The systems are card centric in that the card ultimately holds the correct and current set of data for that user.

The following describes a typical use of proprietary transit card by a user of a transport system. At the start of their journey, the user presents their transit card on a reader/validator. This is sometimes referred to as 'tapping-in'. The reader attempts to establish the valid products on the card and select the correct one for the journey from that location. When using the prepaid element, the reader firstly looks to see if there are sufficient funds on the card to pay for the minimum fare from that point. If there are sufficient funds, the maximum fare may be deducted. Although deducting the maximum fare may cause the balance on the card to go overdrawn, it acts as an incentive for the user to always tap-out. When leaving the transport system at the end of a journey, the users again present their transit card on a reader/validator. This is sometimes referred to as 'tapping-out'. The reader then calculates the fare dependent on the start and end locations of the journey and updates the balance on the card accordingly.

There is a general desire for proprietary cards to be phased out and for transport systems to allow users to tap-in and tap-out using standard bank issued cards, with the payment for the journey made as an online or offline transaction. This is a lot more convenient for users of a transport system who are not required to own a separate card that can only be used for the single purpose of travelling on a specific transport system. Preferably, any contactless chip credit, debit, commercial, prepaid or charge card or other device could be used to make payments on public transport services. A user of such a transport system would tap-in with their standard issue bank card prior to travelling on the transport system and tap-out with the same card at the end of the journey. The charged amount may depend on the locations, mode of transport and the time of day that the card was tapped-in and tapped-out.

Important to the effective operation of a transport system are mechanisms to ensure that users are not able to evade payment for their journeys. Barriers at the entry and exit of a transport system are an important deterrent but they are not suitable for all environments and it may be possible for a sufficiently motivated individual to jump or otherwise bypass them in order to avoid tapping-in and tapping-out. Furthermore parts of a system, or some entire systems, may be unmanned and rely on alternatives such as platform validators whereby the user is trusted to tap in and out on the correct validators to indicate where and when they travelled—clearly these systems may be more open to abuse by any individual who intends on defrauding the transit agency. Accordingly, transport systems often have inspectors who travel on the system and verify that users travelling on the transport system have taken the appropriate steps to secure their right to travel. Even though inspectors can only verify a relatively small number of all of the users of a transport system in this manner, knowledge of their presence, and the threat of a punitive fee and/or criminal prosecution if caught, is an effective deterrent against users trying to avoid payment of their journey.

When users of a transport system have a physical ticket or a purpose-issued transit card, an inspector can easily check that a user has paid, or tapped-in, for a journey as all that the inspector requires to verify the user's behaviour is the physical ticket or to read the data stored on the card or visually inspect a printed ticket. However, a problem arises when a standard issue bank card is used to tap-in for a journey as there is no data stored on the card that will inform the inspector whether the card has been used to tap-in as required.

More particularly, the current state of the art for verifying if a standard issue bank card has been used to tap-in to a transport system typically operates as follows. When the card is tapped-in at a fixed terminal at an entry to the transport system, the fixed terminal sends the ID and other data read from the card to a back office for use in fare calculation and other processes. An inspector on the transport system will have a portable device for reading ID and other data from users' cards. The read card data by the inspector is then transmitted to the back office. At the back office, processing is performed overnight, i.e. at the end of the transport system's operating day, to verify that the read card data corresponds to a card that has been tapped-in. If the card data read by the inspector does not correspond to a tapped-in user, then it is determined that a penalty should be issued to the inspected user.

A problem with the above technique for inspecting a standard issue bank card is that the inspector has very limited ability at the time of inspection to determine whether or not the user has tapped-in as required. The inspector may therefore be unable to issue a legally binding penalty fare notice (usually paper-based) to the user. Moreover, if the user is unregistered with the transport system, and their name and address are not known by the transport system so, even if the back office detects a user who has not paid for their journey, the back office will have insufficient information to issue a legally binding penalty fare notice to the user and this results in a lower penalty, or no penalty at all, being applied.

An additional problem is that the user experience is poor since, unlike with proprietary transit cards, a user is not informed that they have passed the inspection at the time of the inspection. For example, a user may have more than one card suitable for paying for their journey. If the user accidentally presents a different card to the inspector than that used when tapping-in, the user will be incorrectly detected in the end of day processing as someone who has not attempted to pay even though the user thought that they would pass the inspection.

There is therefore a need to improve the inspection, or verification of the behaviour, of users of a transport system when standard bank cards, or other non-proprietary media, are used to pay for journeys.

SUMMARY OF THE INVENTION

According to a first aspect of the invention, there is provided a method of inspecting a user device of a user of a transport system, the method comprising: obtaining, by a portable inspection device, identification data of a user device of a user of a transport system; generating an inspection result of the user device, by an inspection system, in dependence on the read identification data and an item in a record within a database, wherein the record comprises a plurality of items each relating to entry data of a user device of a user of the transport system; and conveying, by the portable inspection device, the result of the inspection.

Preferably, obtaining identification data of a user device comprises reading the user device by the portable inspection device.

Preferably, generating an inspection result of the user device comprises: either searching, or performing a look-up, in the record with data dependent on the identification data; and generating the inspection result in dependence on data dependent on the identification data corresponding to entry data of a user device in the record.

Preferably conveying the result of the inspection comprises displaying, by the portable inspection device, the result of the inspection.

Preferably the inspection system comprises said portable inspection device and a server, wherein the server is remote from the portable inspection device.

Preferably, the method further comprises reading, by an entry user device reader configured to record the entry of user devices to the transport system, the identification data of user devices that enter the transport system; generating entry data for each user device, wherein the entry data is generated in dependence on the read identification data, the time that the entry user device reader read the user device of the user and the location of the entry user device reader; and transmitting the entry data of each user device to the server.

Preferably, the method further comprises receiving, by the server, entry data of a plurality of user devices; and generating, by the server, the record in dependence of the received entry data of the user devices such that, for each user device, the record comprises data dependent on the identification data of the user device associated with the time and location where the identification data of the user device was read.

Preferably, the method further comprises: reading, by an exit user device reader configured to record the exit of user devices from the transport system, the identification data of user devices of users when the user devices exit the transport system; generating exit data for each user device in dependence on the read identification data; and transmitting the exit data of each user device to the server.

Preferably, the method further comprises: receiving, by the server, exit data of a user device; and amending the record in dependence of the received exit data of the user device, such that the entry data in the record for the user device is either excised or amended to indicate that it applies to a user device that has already exited the transport system.

Preferably, the method further comprises a computing device for a location: receiving entry data of a plurality of user devices from all of the entry user device readers at the location; determining a time at which all of the received entry data, that has not already been transmitted to the server, is to be provided to the server; generating a batch of entry data that has not already been transmitted to the server, the batch comprising received entry data at, or prior to, the determined time; and transmitting the batch of entry data to the server, wherein the transmitted batch comprises time data that provides the determined time for the entry data comprised in the batch.

Preferably, the transmitted batch further comprises: location data that provides the location of the entry user device readers that generated the entry data of the batch; and status data that indicates whether or not the batch comprises all of the received entry data by the computing device at, or prior to, the determined time and after a determined time of the previously transmitted batch to the server by the computing device.

Preferably, the method further comprises: receiving, by the server, batches of entry data from a plurality of computing devices at a respective plurality of locations; and generating a second record in dependence on the received batches, wherein the second record comprises, for each location, determined time and status data of the most recently received batch from that location.

Preferably, the method further comprises: inputting time and location data to the portable inspection device; and determining, by the inspection system, a user device that has failed the inspection in dependence on the received time and location data and the data in the second record.

Preferably, the method further comprises: transmitting the data dependent on the read identification data to the server, wherein said search, or look-up, of the record and determination of an inspection result are performed by the server; transmitting the inspection result to the portable inspection device.

Preferably, the method further comprises: transmitting, by the server, the record to the portable inspection device; wherein said search, or look-up, of the record and determination the inspection result are performed by the portable inspection device.

Preferably, the method further comprises: transmitting time and location data input to the portable inspection device to the server, wherein said determination of a user device that has failed the inspection in dependence on the received time and location data and the data in the second record is made by the server; and transmitting the determination result to the portable inspection device.

Preferably, the method further comprises transmitting, by the server, the second record to the portable inspection device; wherein said determination of a user device that has failed the inspection in dependence on the received time and location data and the data in the second record is made by the portable inspection device.

Preferably, the user device is one of a standard issue credit card, debit card, prepaid card, charge card, mobile telephone, sticker, watch or key fob of the user.

According to a second aspect of the invention, there is provided a portable inspection device for inspecting a user device of a user of a transport system, the portable inspection device being configured to: obtain identification data of a user device of a user of a transport system; obtain an inspection result of the user device in dependence on the read identification data and an item in a record within a database, wherein the record comprises a plurality of items each relating to entry data of a respective user device of a respective of users of the transport system; and convey the result of the inspection.

According to a third aspect of the invention, there is provided an inspection system configured to perform the method of an inspection system as set out in any of the above-described methods.

BRIEF DESCRIPTION OF DRAWINGS

Embodiments of the present invention will now be described, by way of example only, with reference to the accompanying drawings, in which:

FIG. 2 shows contents of a first record according to an embodiment of the invention;

FIG. 3 shows contents of a second record according to an embodiment of the invention.

DETAILED DESCRIPTION

Embodiments of the invention provide a method and system that improve the certainty of inspections of the behaviour of users of a transport system.

Embodiments are applicable for use with any type of transport system or indeed to in any application where user inspection is required.

Users are admitted to the transport system, and pay for their travel, using a standard issue bank card, that may be a contactless credit, debit, prepaid, or charge card. The payment device may alternatively be any type of mobile device, such as mobile telephone, sticker, watch or key fob of the user. Users do not require a purpose-issued transit card nor any other card containing transit-specific functionality in order to use the transport system. Although users are described as tapping-in with cards throughout the description of embodiments, it will be understood that the embodiments include users tapping-in with any type user device, such as one of those listed above.

Figure 1:
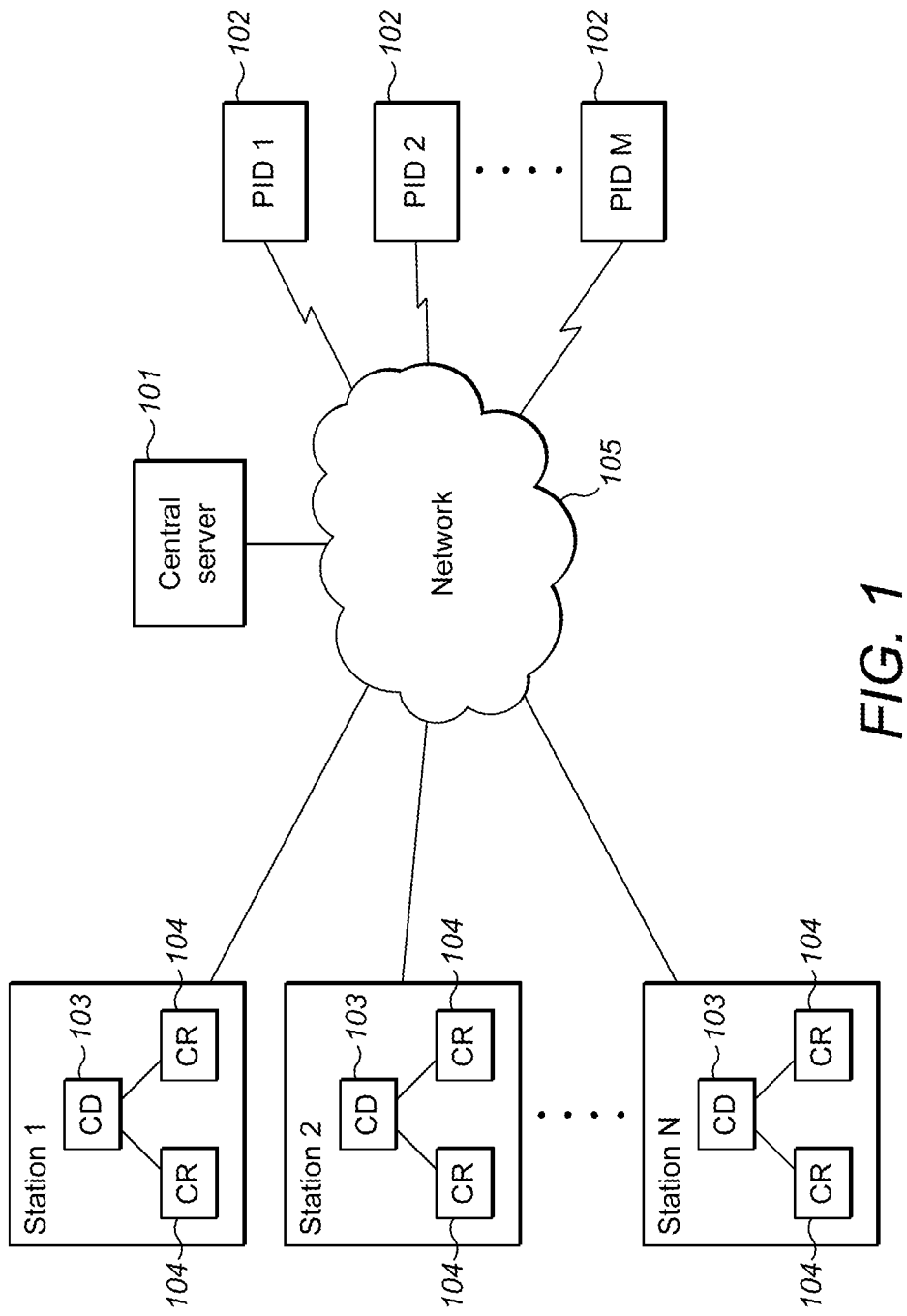
FIG. 1 shows a system for inspecting user devices of users of a transport system according to an embodiment of the invention.

FIG. 1 shows a system for validating users of a transport system according to embodiments of the invention.

The transport system has a plurality of N stations. Each station comprises a plurality of card readers (CR) 104 for reading the cards of users. The card readers 104 within each station are all connected to a local computing device (CD) 103. The card reader 104 and computing device 103 of all of the stations are able to communicate, over a network 105, with a central server 101. The communication may be over a wired communications network and implemented by any known communications technique.

The system also comprises a plurality of M portable inspection devices (PIDs) 102 with each PID being carried and used by an inspector on the transport system. Each PID 102 communicates with the central server 101 via a wireless connection with the network 105. The wireless communications may be performed via station Wi-Fi, on-board Wi-Fi, Edge, GPRS, 3G, 4G or any other known wireless communications technique. Each PID my alternatively, or in addition, communicate with the central server 101 via a wired connection with the network 105, for example via docking devices provided at stations.

According to an embodiment, a user of a transport system is required to tap-in using their card prior to travelling on the transport system.

The card ID, that may be the primary account number, PAN, of the card, and other data such as the card's expiry date and sequence number is read from the user's card by a card reader 104 when the card is tapped-in. A tokenised PAN is then generated in dependence on the read card data and entry data for the user is generated that comprises the tokenised PAN, the time that the card data was read and the location that the card was read. Each card reader 104 is located at a station of the transport system, with each station typically comprising a plurality of card readers 104. A local computing device 103 within each station receives entry data of a plurality of users from each of the card readers 104 and then transmits a batch of users' entry data to a central server 101. Alternatively, a transit agency may send tap data immediately to a central server 101 without batching them.

The transmitted batch of entry data includes an indication of whether or not status of the batch is complete or incomplete together with a precise time of the status. The transmitted batch is considered complete if, at the time for the batch, it includes full and error-free reports from every functioning reader at that location, that is to say, the batch comprises entry data for all of the tapped-in cards of users since the previous batch of entry data of users was transmitted to the central server 101. If it cannot be determined that the batch is complete, the status of the batch is considered incomplete. If all components of the card reading, local computing device 103 and communications systems are working correctly, all transmitted batches would have a complete status. An incomplete status may be caused, for example, by one of the card readers 104 correctly reading users' cards when the users tap-in, and the users being allowed to enter the transport system, but a communications fault preventing the entry data from the card reader 104 being correctly received by the local computing device 103. In order to avoid an unacceptable delay of entry data being transmitted to the central server 101 that has been read by other card readers 104 at the station, and correctly received by the local computing device 103, the local computing device 103 transmits a batch with an incomplete status. Note that it would normally be expected that on the vast majority of occasions all of the status reports would be complete.

The central server 101 is in communication with all of the local computing devices at stations of the transport system. The central sever receives the batches of entry data of users from each station and uses the received entry data to compile a record, or list, of all of the read cards of users who have tapped-in to the transport system together with the time that the card was tapped-in and the location that the card was tapped-in.

FIG. 2 shows an example of some of the data stored in a first record that the central server 101 generates and maintains according to an embodiment. The first column of the first record as shown in FIG. 2 comprises received tokenised PANs of users. The second column comprises the time and date that each of the users' cards was read. The third column comprises the location that each card was read. The locations may be stored as only the name of the station that comprised the card reader 104 of the user's card.

FIG. 3 shows an example of some of the data stored in a second record that the central server 101 also generates and maintains according to an embodiment. The purpose of the record shown in FIG. 3 is to provide data on when entry data from a particular station was last provided to the central server 101. As described above, each batch of user entry data transmitted from a station comprises a time and status of the batch. The central server 101 uses this data to compile the second record.

The first column of the second record as shown in FIG. 3 may be the name of a station.

The second column of the second record indicates whether or not the status of the station is complete or incomplete. The status for the station is complete if all of the batches received on the operating day of the transport system have been complete. If an incomplete batch is received, the status of the station is incomplete and remains incomplete unless a subsequent batch, from one or more incomplete batches, comprises any entry data that was not received due to the one or more incomplete batches being transmitted, such that it can be determined that all of the entry data of tapped-in users has been provided to the central server 101 for that operating day. If such a determination can be made, the status of the station is changed to complete.

The third column of the second record provides the time associated with the status of the most recently received batch of entry data.

The first and second records may have any form that is suitable for storing data and be a file or other type of data structure. For example, the records may comprise a plurality of items with each item storing data for a user and/or station.

After travelling on the transport system, users may be required to tap-out at a card reader using the same card that they tapped-in with. For each user, a tokenised PAN is generated from the card data read by the card reader 104 and the tokenised PAN is transmitted to the central server 101 as exit data. The central server 101 then amends the first record to no longer comprise the stored tokenised PAN, entry time and location that were generated for the user hence indicating that the user is no longer in transit within the transport system. Alternatively, the first record may maintain the entry in the first record for the user but amend it to comprise an indication that the user has tapped-out of the transport system. The system is also designed to handle scenarios where a user only has to tap in (for a flat fare system), or where a user has to make multiple taps to complete their journey (such as a user having to transfer between trains, or transfer between modes of transport). The first record may therefore maintain data for handling taps that are for such transfers during a journey or data that indicates a specific route was taken.

Accordingly, the first record, as shown in FIG. 2, comprises a list of users' cards that are known to be validly tapped-in to the transport system.

The second record provides a time, for each station of the transport system with a complete status, after which it is known that the first record comprises, or has comprised, all of the users who tapped-in at the station prior to that time.

The transport system has inspectors who travel on the system and verify the valid actions of users travelling on the transport system. Each inspector carries a PID 102. The PID 102 is a portable device that comprises a card reader. The PID 102 is equipped to communicate over a wireless, or wired, connection to the central server 101. The PID 102 may comprise a computing device with a processor, memory, display and user interface.

In order to verify if a user of the transport system has tapped-in for their current journey, the inspector reads the card of a user with the PID 102. If the PID 102 is currently able to communicate with the central server 101 over a wireless connection, the read card data is transmitted to the central server 101 as soon as it has been read. If an PID 102 is currently unable to establish communications, the communications from the PID 102 are delayed until wireless or wired communications are available and then commenced as soon as possible thereafter.

In response to receiving the read card data from the PID 102, the first central server 101 searches the first column of the first record in order to determine if the first record comprises a tokenised PAN that corresponds to the read card details. As an alternative to the first record being searched the central server 101 may maintain a list of PANs along with the last known time and location at which the corresponding card was tapped-in. Advantageously, a look-up operation could then be performed, instead of a search, and this will typically be much quicker and less processor intensive.

If a corresponding entry in the first record is found, the central server 101 transmits a confirmation message back to the PID 102 that the user has validly tapped-in to the transport system. The PID 102 then displays the confirmation signal to the inspector.

Advantageously, the inspector receives a substantially real time confirmation that the inspected user has validly tapped-in to the transport system with their card.

Preferably, the central server 101 also transmits the stored time and location data of the entry to the PID 102 together with the confirmation. The PID 102 displays this additional information to the inspector and the inspector can further check that the tapped-in time and location are consistent with the present time and location of the user that is being inspected.

If the central server 101 determines that there is no tokenised PAN that corresponds to the read card data in the first record, then the central server 101 sends a message to the PID 102 that informs the inspector that it is not possible to confirm that the user is a validly tapped-in user at the present time.

The inspector then asks the user to provide him with the time and location that the user entered the transport system. The inspector then enters the time and location that the user has provided into the PID 102 and the PID 102 transmits the time and location to the central server 101. The central server 101 searches the second record to determine when the tapped-in data was last received from the location and whether or not the status of the station at the time was complete or incomplete.

If the station status was complete, and a comparison determines that the time provided by the user is earlier than that of the entry data update time for the station, the central server 101 transmits a message to the PID 102 that informs the inspector that the user has provided suspicious journey details.

If the tapped-in data for the location is incomplete, the central server 101 instead compares the time provided by the user with the time of the last complete status of the station. The central server 101 then transmits a message to the PID 102 that informs the inspector that the user has provided suspicious journey details if the comparison determines that the time provided by the user is earlier than that of the last complete entry data update time.

The inspector is therefore able to determine that the user has not validly tapped-in for their journey since, if the user had tapped-in where and when the user said, this would have been detected when the first record was searched with their card details.

Preferably, the message transmitted to the PID 102 also comprises the time of the most recent status update for the location. This allows the inspector to determine that a user has potentially validly tapped-in if the time provided by the user is close to that of the status update. Such judgement by the inspector is appropriate since a user is not expected to recall the precise time that they tapped-in, but can reasonably be expected to provide a time within, for example, two minutes of the actual tap-in time.

The message transmitted to the PID 102 may also comprise an indication of whether or not the current status of the station is complete or incomplete in order to inform the inspector of any problems at particular stations.

If the central server 101 determines that the time provided by a user for a location is after the time of the most recently received complete batch, then the central server 101 transmits a message to the PID 102 that informs the inspector that the tapping-in of the user cannot be verified at the present time. Preferably, the time of the most recently received complete batch is also transmitted to the PID 102 to help the inspector determine if the time provided by the user is feasible.

When an inspector is informed that the tapping-in of the user cannot be verified at the present time, the inspector preferably asks the user to provide their name and address. These details are preferably proved to the inspector by the user providing an identity card, passport or similar document. The inspector enters this additional data into the PID 102 and the PID 102 transmits the name and address of the user to the central server 101. The central server 101 may verify the name and address using electoral data or other means. The central server 101 may then store the name and address in association with the tokenised PAN for use if it is ever necessary to post a fine to that user.

As described in the background section of the present document, the central server 101 may then perform overnight checking of the user to confirm if the user validly tapped-in. If the overnight checking determines that the user did not validly tap-in, a fine may be issued to the user. If the central server 101 has been provided with the name and address of the user, the full penalty fine can be posted to the user.

Advantageously, the above allows an inspector to quickly determine of a user has validly tapped-in for a journey on a transport system, if a user has not validly tapped-in for a journey on the transport system, or if it is not possible, at the present time, to determine if a user has validly tapped-in. Embodiments will typically provide the inspector with the result of the inspection within one second of the user's card being read. This is a significant improvement over known techniques that only provide overnight verification of users. This also results in improved user experience as the user is informed at the time of the inspection that the inspection was successful. This avoids any problems that may occur due to a user tapping-in correctly but accidentally providing the inspector with a different card when inspected.

In a particularly preferred embodiment, the records are downloaded by, or pushed to, the PIDs. This allows inspection results to be provided to an inspector when the PID does not have wireless connectivity.

A number of example scenarios in which an inspector on the transport system attempts to verify a user are now described.

In the first example scenario, a user taps in at a station. The local computing device 103 at the station transmits the user's entry data, in a batch of entry data, to the central server 101. The central server 101 receives the batch of entry data and updates the first and second records.

An inspector reads the card data of the user with a PID 102 that automatically transmits the card data, as a tokenised PAN, to the central server 101. The central server 101 receives the tokenised PAN, searches, or performs a look-up in, the first record and finds the entry data for the user. The central server 101 automatically responds to the PID 102 with a confirmation message that verifies the user. The PID 102 receives the confirmation message and automatically displays a positive verification indication. The inspector is therefore able to verify that the user had validly tapped-in to the transport system within about 1 second of reading the user's card.

The second example scenario is the same as the first example scenario except that the user jumps the barrier at the station and does not tap-in for their journey.

The central server 101 receives a batch of tap-in data from the local computing device 103 at the station and updates the first and second records. The second record has an entry for the station, with a complete status, at a determined time.

An inspector reads the card data of the user with a PID 102 that automatically transmits the card data, as a tokenised PAN, to the central server 101. The central server 101 receives the tokenised PAN, searches, or performs a look-up in, the first record and does not find the entry data for the user. The central server 101 automatically responds to the PID 102 with a message informing the inspector that the user cannot be verified.

The inspector then asks the user to provide their start location, i.e. station, for the journey and time that they entered the station. The user tells the inspector that they boarded at a particular station at a particular time. The inspector enters this data into the PID 102 that automatically transmits the data to the central server 101.

The central server 101 searches, or performs a look-up, for the station in the second record and determines that all of the entry data at, or prior to, the provided time has been received from that station. The central server 101 automatically transmits a message to the PID 102 informing the inspector that the time and location provided by the user are suspicious. The inspector can therefore determine that an inspected user has not tapped-in less than 1 second after reading the user's card and is able to issue a written penalty notice to the user there and then.

The third example scenario is the same as the first example scenario except that the inspector uses the PID 102 to read the card data of the user at an earlier time.

The central server 101 receives a tokenised PAN from the PID 102 and searches, or performs a look-up, for it in the first record. The central server 101 automatically responds to the PID 102 with a message informing the inspector that the user cannot be verified.

The inspector then asks the user to provide their start location for the journey and time that they entered the station. The user tells the inspector the station and time that they boarded at. The inspector enters this data into the PID 102 that automatically transmits the data to the central server 101.

The central server 101 searches, or performs a look-up, for the station in the second record and determines that only entry data prior to an earlier determined time has been received from that station. The central server 101 automatically transmits a message to the PID 102 informing the inspector that the time and location provided by the user still cannot be verified.

The inspector is therefore informed that it is not possible to verify the user at this stage and so they do not issue a fine to the user. However, the inspector may decide to ask the user to provide their name and address, preferably verified by an ID card or other means. The inspector enters this additional data into the PID 102 and the PID 102 transmits the name and address of the user to the central server 101. The central server 101 stores the received name and address information with the tokenised PAN in case these are ever required for contacting the user. In one embodiment, once the second record has been updated to show that all of the entry data prior to a later determined time than the time provided by the user has been received from the station, if the user's card details are still not included then the previously indeterminate inspection can be finalised to show that the user had not tapped-in when and where they claimed and a penalty may subsequently be issued by the system by post.

An alternative embodiment to that described above differs by the central server 101 transmitting the first and second record to the PIDs 102 of inspectors. The first and second records may be transmitted to an PID 102 automatically, at for example, regular time intervals, in response to a request for the first and second records received from the PID 102 at the central server 101 and/or in response to the central server 101 receiving a batch form a station. Each PID 102 has sufficient memory resources to store the received first and second records.

In the present embodiment, the PID 102 determines if read card data is present in the first record by searching the already stored version of the first record on the PID 102. Similarly, the most recent update time of entry data at a station is retrieved from second record already stored on the PID 102.

An advantage of the present embodiment is that the PID 102 can obtain the most recent versions of the first and second records when wireless communication are available and operate whether or not wireless communications are available at the present time. The PID 102 is therefore able to read a user's cards and provide an inspector with a verification result even if the PID 102 is unable to communicate with the central server 101 at the time.

A further advantage is that inspector is provided with a verification result by the PID 102 a lot faster as there is no need to wait for the communications to the remote central server 101 to be performed.

Figure 4:
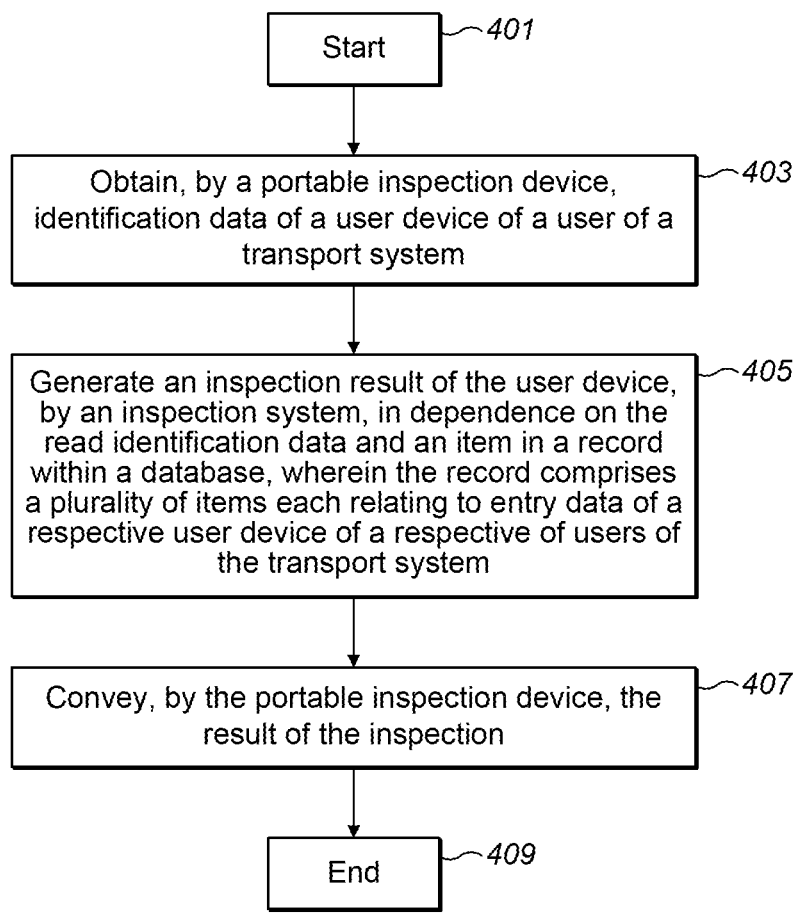
FIG. 4 is a flowchart of a process according to an embodiment of the invention.

FIG. 4 shows a process for inspecting a user of a transport system according to an embodiment.

In step 401, the process begins.

In step 403, the process obtains, by a portable inspection device 102, identification data of a user device of a user of a transport system.

In step 405, the process generates an inspection result of the user device, by an inspection system, in dependence on the read identification data and an item in a record within a database, wherein the record comprises a plurality of items each relating to entry data of a respective user device of a respective of users of the transport system.

In step 407, the portable inspection device 102 conveys the result of the inspection.

In step 409, the process ends.

Throughout the above-described embodiments, users have been described as tapping-in and tapping-out of a transport system. However, embodiments include card readers 104 using any technique to obtain the card details of users on entry and exit of a transport system.

In the above-described embodiments, a tokenised PAN is generated from read card data and the tokenised PAN is transmitted to and stored by a central server 101. Advantageously, storing and transmitting the PAN in a tokenised form improves security. However, it is not essential for a tokenised PAN to be generated and the read card data, or any data dependent thereon, may be transmitted to and stored by the central server 101. Accordingly, the data stored in column 1 of FIG. 2 may be raw read card data or any data dependent on the read card data. It may also be any other data that verifies the user, such as data read from a barcode.

In the above-described embodiments, all of the stations transmit entry data to the central server 101 in a batch with a time associated with the batch. In an alternative embodiment, each of the card readers 104 autonomously transmits read entry data to the central server 101, without the entry data being transmitted from the station in a batch. The local computing device 103 at the station communicates data to the central server 101 on which of the card readers 104 are operational at the station at the present time and if any fault with communications from one or more of the card readers 104 has occurred. The central server 101 is able to generate the second record, in particular the most recent time that complete entry data from a station has been provided, from the received entry data of all of the readers at the station as well as the further data provided by the local computing device 103.

Advantageously, the first and second records are respectively updated with entry data and status information more quickly than if entry data is only transmitted in a batch.

In the above described embodiments, an inspector may ask a user to provide him with the time and location that the user entered the transport system. Alternatively, the inspector may only ask the user only for a location and only enters the location that the user has provided into the PID 102. The PID then provides the inspector with the time that the last complete report was received from that location. The inspector can then judge for himself whether or not it is realistic that the user tapped-in as claimed.

The records shown in FIGS. 2 and 3 are examples and embodiments include implementations in which the records comprise additional or different data. For example, embodiments are also applicable to tap-in only systems, i.e. a transport system on which all journeys are the same price. Such a system could be implemented without any exit data being recorded.

All of the processes of embodiments described throughout the present document may be automated, however this is not essential and some of the processes may not be automated.

Throughout the present document, users have been described as tapping-in and tapping-out of a transport system with cards. These may be any type of contactless chip credit, debit, commercial, prepaid or charge card. Embodiments also include the use of other devices than cards that have the same purpose of allowing the entry and exit of a user from a transport system to be determined. Such devices include a mobile phone, a sticker, key fob, watch or any other non-card form factor that is capable of making a contactless payment.

The flow charts and descriptions thereof herein should not be understood to prescribe a fixed order of performing the method steps described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A method of inspecting a user device of a user of a transport system, wherein an inspection system comprises a portable inspection device and a server, the server being remote from the portable inspection device, the method comprising:

obtaining, by the portable inspection device, identification data of the user device of the user of the transport system;
generating an inspection result of the user device, by the inspection system, in dependence on the read identification data and an item in a record within a database, wherein the record comprises a plurality of items each relating to entry data of a respective user device of a respective plurality of users of the transport system;
conveying, by the portable inspection device, the result of the inspection;
receiving, by the server, batches of entry data from a plurality of computing devices at a respective plurality of locations; and
generating, within a database, a second record in dependence on the received batches, wherein the second record comprises, for each location, determined time and status data of the most recently received batch from that location.

2. The method according to claim 1, wherein obtaining identification data of a user device comprises reading the user device by the portable inspection device, and wherein conveying the result of the inspection comprises displaying, by the portable inspection device, the result of the inspection.

3. The method according to claim 2, wherein the user device is at least one of a contactless chip credit card, debit card, commercial card, prepaid card, charge card, mobile telephone, sticker, watch, key fob or any other form factor that is capable of making a contactless payment of the user.

4. The method according to claim 1, wherein generating an inspection result of the user device comprises:
either searching, or performing a look-up, in the record with data dependent on the identification data; and
generating the inspection result in dependence on data dependent on the identification data corresponding to entry data of a user device in the record.

5. The method according to claim 4, the method further comprising:
transmitting the data dependent on the read identification data to the server, wherein said search, or look-up, of the record and determination of the inspection result are performed by the server;
transmitting the inspection result to the portable inspection device.

6. The method according to claim 4, the method further comprising:
transmitting, by the server, the record to the portable inspection device;
wherein said search, or look-up, of the record and determination of the inspection result are performed by the portable inspection device.

7. The method according to claim 1, further comprising:
reading, by an entry user device reader configured to record the entry of user devices to the transport system, the identification data of user devices that enter the transport system;
generating entry data for each user device, wherein the entry data is generated in dependence on the read identification data, the time that the entry user device reader read the user device of the user and the location of the entry user device reader; and
transmitting the entry data of each user device to the server.

8. The method according to claim 1, further comprising:
receiving, by the server, entry data of a plurality of user devices; and generating, by the server, the record in dependence of the received entry data of the user devices such that, for each user device, the record comprises data dependent on the identification data of the user device associated with the time and location where the identification data of the user device was read.

9. The method according to claim 1, further comprising:
reading, by an exit user device reader configured to record the exit of user devices from the transport system, the identification data of user devices of users when the user devices exit the transport system;
generating exit data for each user device in dependence on the read identification data; and
transmitting the exit data of each user device to the server.

10. The method according to claim 9, further comprising:
receiving, by the server, exit data of a user device; and
amending the record in dependence of the received exit data of the user device, such that the entry data in the record for the user device is either excised or amended to indicate that it applies to a user device that has already exited the transport system.

11. The method according to claim 1, the method further comprising:
inputting time and location data to the portable inspection device; and
determining, by the inspection system, a user device that has failed the inspection in dependence on the received time and location data and the data in the second record.

12. The method according to claim 11, the method further comprising:
transmitting time and location data input to the portable inspection device to the server, wherein said determination of a user device that has failed the inspection in dependence on the received time and location data and the data in the second record is made by the server; and
transmitting the determination result to the portable inspection device.

13. The method according to claim 11, the method further comprising transmitting, by the server, the second record to the portable inspection device; wherein said determination of a user device that has failed the inspection in dependence on the received time and location data and the data in the second record is made by the portable inspection device.

14. A method of inspecting a user device of a user of a transport system, wherein an inspection system comprises a portable inspection device and a server, the server being remote from the portable inspection device, the method comprising:
obtaining, by the portable inspection device, identification data of the user device of the user of the transport system;
generating an inspection result of the user device, by the inspection system, in dependence on the read identification data and an item in a record within a database, wherein the record comprises a plurality of items each relating to entry data of a respective user device of a respective plurality of users of the transport system;
conveying, by the portable inspection device, the result of the inspection; and
further comprising a computing device for a location:
receiving entry data of a plurality of user devices from all of the entry user device readers at the location;
determining a time at which all of the received entry data, that has not already been transmitted to the server, is to be provided to the server;

generating a batch of entry data that has not already been transmitted to the server, the batch comprising received entry data at, or prior to, the determined time; and transmitting the batch of entry data to the server, wherein the transmitted batch comprises time data that provides the determined time for the entry data comprised in the batch.

15. The method according to claim 14, wherein the transmitted batch further comprises:

location data that provides the location of the entry user device readers that generated the entry data of the batch; and status data that indicates whether or not the batch comprises all of the received entry data by the computing device at, or prior to, the determined time and after a determined time of the previously transmitted batch to the server by the computing device.

16. An inspection system comprising a portable inspection device and a server, the server being remote from the portable inspection device, the inspection system being operative to perform a method of inspecting a user device of a user of a transport system comprising:

obtaining, by the portable inspection device, identification data of the user device of a user of the transport system;

generating an inspection result of the user device, by the inspection system, in dependence on the read identification data and an item in a record within a database, wherein the record comprises a plurality of items each relating to entry data of a respective user device of a respective plurality of users of the transport system;

conveying, by the portable inspection device, the result of the inspection;

receiving, by the server, batches of entry data from a plurality of computing devices at a respective plurality of locations; and generating, within a database, a second record in dependence on the received batches, wherein the second record comprises, for each location, determined time and status data of the most recently received batch from that location.

17. The inspection system according to claim 16, the method performed by the inspection system further comprising:

inputting time and location data to the portable inspection device;

determining, by the inspection system, a user device that has failed the inspection in dependence on the received time and location data and the data in the second record.

18. The inspection system according to claim 17, the method performed by the inspection system further comprising: transmitting, by the server, the second record to the portable inspection device; wherein said determination of a user device that has failed the inspection in dependence on the received time and location data and the data in the second record is made by the portable inspection device.

19. An inspection system comprising a portable inspection device and a server, the server being remote from the portable inspection device, the inspection system being operative to perform a method of inspecting a user device of a user of a transport system comprising:

obtaining, by the portable inspection device, identification data of the user device of a user of the transport system;

generating an inspection result of the user device, by the inspection system, in dependence on the read identification data and an item in a record within a database, wherein the record comprises a plurality of items each relating to entry data of a respective user device of a respective plurality of users of the transport system; and conveying, by the portable inspection device, the result of the inspection;

the inspection system further comprising a computing device for a location, the computing device being operative to:

receive entry data of a plurality of user devices from all of the entry user device readers at the location;

determine a time at which all of the received entry data, that has not already been transmitted to the server, is to be provided to the server;

generate a batch of entry data that has not already been transmitted to the server, the batch comprising received entry data at, or prior to, the determined time; and transmit the batch of entry data to the server, wherein the transmitted batch comprises time data that provides the determined time for the entry data comprised in the batch.

20. The inspection system according to claim 19, wherein the transmitted batch further comprises:

location data that provides the location of the entry user device readers that generated the entry data of the batch; and status data that indicates whether or not the batch comprises all of the received entry data by the computing device at, or prior to, the determined time and after a determined time of the previously transmitted batch to the server by the computing device.

* * * * *